April 2, 1935.   H. C. FIELD ET AL   1,996,572
WINDOW ASSEMBLY
Filed May 10, 1933   2 Sheets-Sheet 1

INVENTORS.
HERBERT C. FIELD.
BENJAMIN H. BOWLUS.
BY
Barnes, Kisselle & Laughlin
ATTORNEYS.

April 2, 1935.  H. C. FIELD ET AL  1,996,572
WINDOW ASSEMBLY
Filed May 10, 1933   2 Sheets-Sheet 2
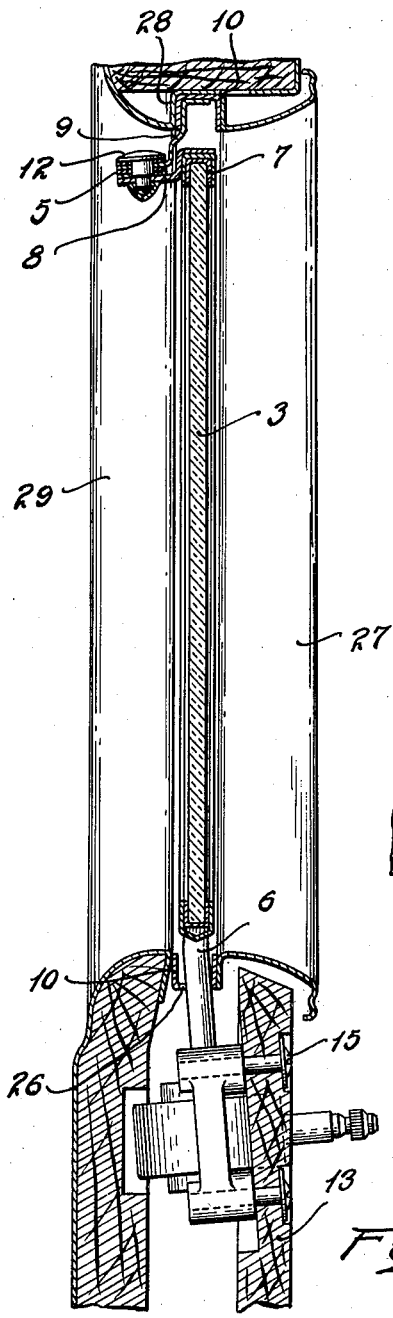
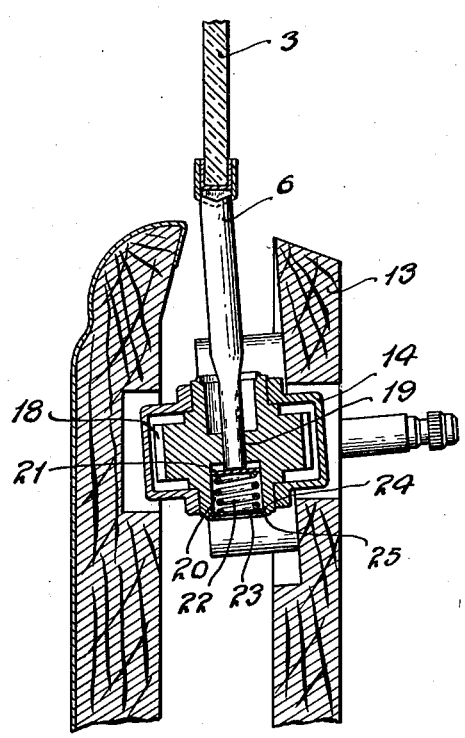
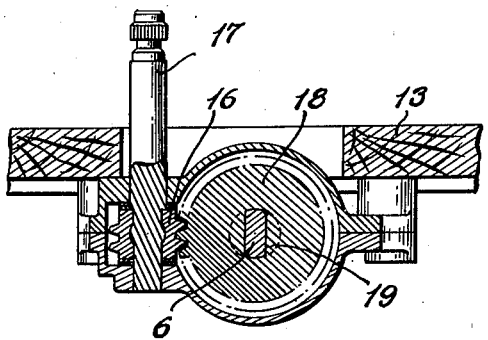
INVENTORS.
HERBERT C. FIELD.
BENJAMIN H. BOWLUS.
BY Barnes, Kisselle & Laughlin
ATTORNEYS.

UNITED STATES PATENT OFFICE 1,996,572

WINDOW ASSEMBLY

Herbert C. Field, Windsor, Ontario, Canada, and Benjamin H. Bowlus, Detroit, Mich., assignors to Ternstedt Manufacturing Company, Detroit, Mich., a corporation of Michigan Application May 10, 1933, Serial No. 670,248

18 Claims. (Cl. 296—44)

This invention relates to a window assembly and more particularly to a window assembly of the pivoted panel type for an automotive vehicle.

There has gone into extensive use a ventilation system for vehicle bodies in which the ventilation of the body is effected and controlled through the front and rear windows. This system is known as the Fisher no-draft ventilating system. In this system the front window assembly is of the composite type, that is, the window opening is closed by two cooperating window panels, the forward panel being pivoted to swing in and out of the window opening upon an upright axis somewhat to the rear of its front edge and the rear panel being vertically slidable to open and closed position. The pivoted panel can be swung outwardly through an arc of 90° or more whereupon it serves as a scoop to deflect the air into the body. This scooping position of the pivoted panel is especially useful for hot summer days when it is desirable to obtain as much air as possible within the vehicle body. When this type of pivoted panel is swung to scooping position it is desirable to have as much of the panel as possible projecting out of the window opening and to have as great a gap as possible between the panel and the door pillar, that is, the front vertical portion of the window frame. If the window is pivoted at its top and bottom edges in the plane of the window panel, and particularly where the door pillar is inclined rearwardly from the belt to the top of the door the gap between the pillar and the panel will not be very large when the panel is swung to scooping position. Then, too, where the pillar is rearwardly inclined, the panel will strike the upper part of the pillar thus limiting the size of the gap and decreasing the angle through which the panel may be swung.

If the pivots of the pivoted panel are offset from the plane of the window opening and positioned on the outside of the panel when in closed position, a greatly increased gap between the panel and the door pillar will be obtained when the panel is swung to scooping position. From this viewpoint the offset pivots are obviously more desirable but it is also desirable that the swinging of the panel be effected by, and controlled through, a window regulator. Where both of the pivots are offset outwardly in the plane of the window panel it is possible to operate the swinging panel with a window regulator, but it has been found that this involves at least two serious disadvantages, first, the regulator assembly is very apt to project outwardly through the window reveal or otherwise mar the æsthetic appearance of the window assembly and body; second, the regulator assembly necessarily is more complex and requires some form of linkage or the like and therefore is both more expensive and more inclined to rattle.

Hence, it is an object of this invention to produce a swinging panel assembly for this type of ventilation system in which a maximum gap and throw of the swinging panel out of the window opening is obtained when the window is swung to scooping position and at the same time effect and control the swinging of the panel through a window regulator which is simple in form and completely concealed within the ordinary window well so that it nowise projects through the reveal or otherwise mars the æsthetic appearance of the window assembly and body.

A further object of the invention is that of producing a swinging panel of the above mentioned type in combination with a window regulator which receives the stem of the pivoted panel in such a manner that the assembly of the swinging panel in the window opening and to the regulator is simplified and greatly facilitated.

This invention also contemplates a novel, rattle-proof connection between a swinging panel and a regulator of this type.

In the drawings:

Figure 2 is a vertical section through the pivoted panel.

Figure 3:
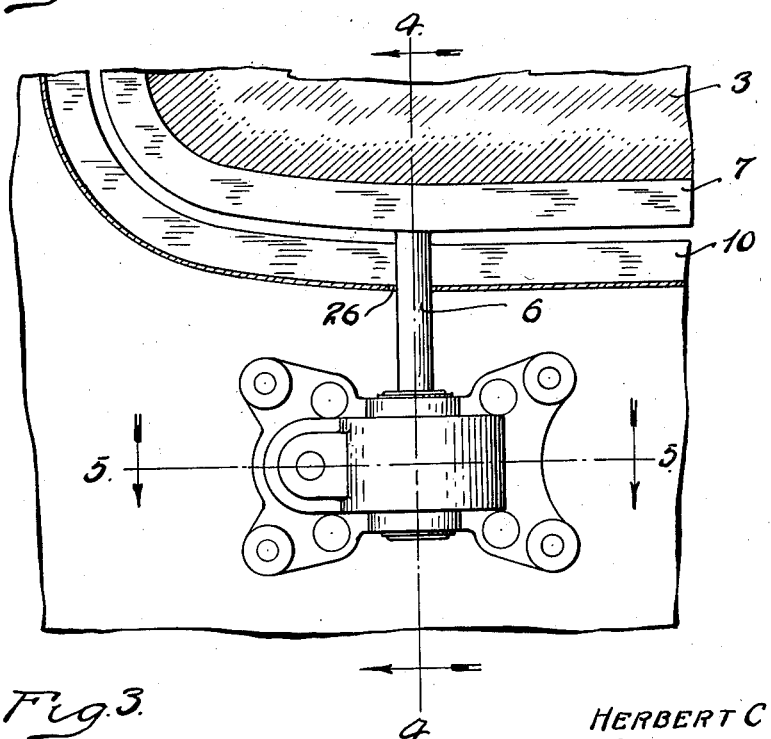
Figure 3 is a detail of the window regulator.

Figures 4 and 5 are sections along the line 4—4 and 5—5 of Figure 3. In Fig. 4, the supporting channel 10 has been omitted, and in Figs. 2, 3 and 4, the weather strip 11 is omitted for clearness of illustration.

Referring more particularly to the drawings there is shown a portion of a vehicle body 1 and an upper window assembly of a Fisher no-draft ventilation system. The front window assembly comprises a vertically slidable panel 2 and a swingable panel 3. The ventilating panel 3 is shown in the full lines in the normal ventilating position. In this position the air flows into the window opening forward of the pivots of the swinging panel and is drawn outwardly to the rear of the pivots thus traveling in a loop. The panel 3 is shown in the dotted lines in scooping position. In this position the projecting portion of the panel scoops the air into the body through the window opening forward of the pivots.

Since it is desirable to provide as large a gap as possible between the pivoted panel and the inclined door pillar 4 which forms the front upright frame member of the window opening to permit a maximum flow of air into the body when the swingable panel is in scooping position, and since it is likewise desirable to operate the swingable panel with a window regulator, to this end the pivoted panel is provided at the top edge somewhat to the rear of the front vertical edge of the panel with an offset pivot 5. This pivot 5 is offset outwardly from the plane of the window panel 3 when in closed position as shown in Figure 2. At its bottom edge the panel is provided with a pivot which takes the form of a shaft or stem 6 which is inclined relative to the glass panel 3 so that the longitudinal axis of the shaft 6 passes through the pivot 5. Hence, the axis about which the window panel pivots intersects the plane of the window when closed at approximately the point at which it enters the window well. The panel 3 is provided with a channel frame 7. The shaft or stem 6 is secured to the lower edge of the channel 7 and the upper edge of the channel 7 has secured thereto the lower leaf 8 of the pivot 5. The upper leaf 9 of the pivot 5 is secured to the channel member or supporting frame 10 which in turn is fixed in the window frame and carries the weatherstrip 11. The pivot leaves 8 and 9 are secured together by the pivot pin 12.

Since it is an object of the invention to provide the pivoted panel with a regulator which serves as a receiver or support for the panel stem, to this end the lock board 13 has secured thereto the regulator casing 14 by any suitable means such as the screws 15. The regulator comprises a driving worm 16 mounted on a driving shaft 17 journaled into the casing 14 which may be driven by any suitable regulator crank handle. The casing has journaled therein the driven worm gear 18 which meshes with the driving worm 16. The driven gear 18 is provided with a rectangular socket opening 19 arranged to receive the lower end of the shaft or stem 6 (Figures 5 and 6) through which the driving torque of the gear 18 is transmitted to the shaft or stem 6 when it is desired to swing the pivoted panel open or closed. The underface of the gear 18 is provided with a socket opening 20 which communicates with the socket 19. The opening 20 is preferably, although not necessarily circular in cross-section and has slidably mounted therein the disk 21 which is supported by the coil spring 22. The coil spring 22 in turn is supported by the disk 23 which is seated against the shoulders 24 and held in place by peening the mouth of the opening 20 as at 25. It will be noted that the shaft or stem 6 projects through the opening 19 into engagement with the disk 21 which forms a yieldable seat for the shaft or stem 6 and transmits the vertical thrust of the coil spring 22 to the shaft or stem 6 and hence to the swinging panel 3 to hold it tightly against rattling.

Before the pivoted panel 3 is assembled in the window opening the panel 3, pivot 5, weatherstrip 11, and channel or supporting frame 10 are assembled together on the bench as one unit. It will be noted that the base of the channel or supporting frame 10 is provided with the opening 26 through which the shaft or stem 6 projects. Prior to securing the garnish molding 27 in the window opening, this unit comprising the pivoted panel 3, pivot 5, and weatherstrip channel 10 is tilted in the window opening against the shoulder 28 of the reveal 29 and the shaft or stem 6 inserted or slipped into the polygonal socket 19 where it is yieldably supported by the coil spring 22 and disk 21. This forms a driving key connection between the stem and the gear. Thereafter the channel 10 can be screwed or otherwise suitably secured in the window opening and the garnish molding 27 installed.

Figure 1:
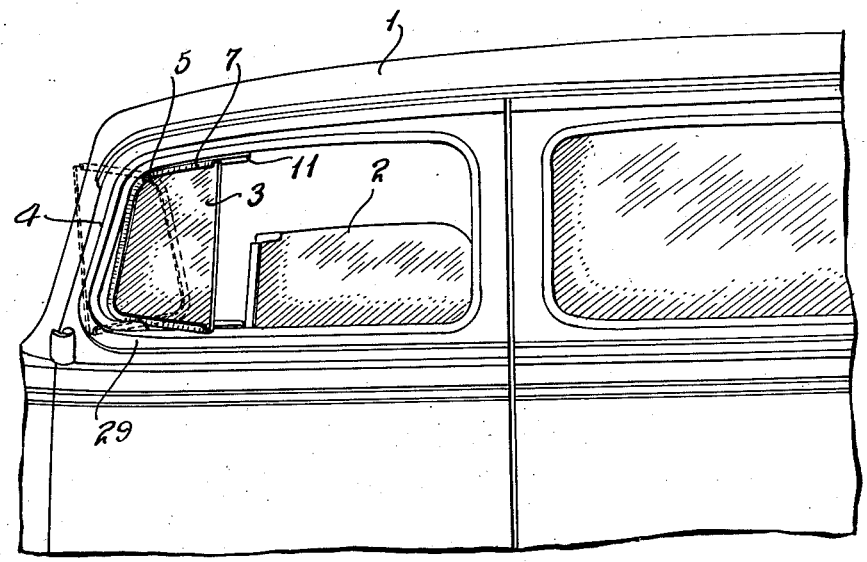
Figure 1 is a side elevation of a portion of a vehicle showing the pivoted panel in two ventilating positions.

It is obvious from the above description that not only does the window regulator serve for supporting the pivoted panel 3 but also lends itself to a facile replacement as well as initial installation of the panel in the window opening. With this arrangement the lower edge of the pivoted panel is pivoted in the plane of the window panel and hence, in nowise detracts from the outer beauty of the window assembly or the body. With the upper pivot 5 offset outwardly of the window panel when in closed position, it is obvious that when the panel 3 is swung to the scooping position as shown in the dotted lines, Figure 1, that the upper portion of the panel 3 is thrown outwardly or to the left of the pivot 5 (as viewed in Figure 2), a distance equal to the distance that the panel 3 is to the right of the pivot 5 as shown in this figure. This throwing of the panel outwardly creates a greater gap between the pillar 4 and the pivoted panel and is permitted by the fact that the shaft or stem 6 is inclined relative to the plane of the panel 3 and has its longitudinal axis aligned with the pivot 5.

We claim:

1. In a window assembly for an automotive vehicle having a window opening and a window well below said opening, a swingable panel for said window opening pivoted at its top and bottom edges, the upper pivot being offset outwardly of the panel when in closed position and the lower pivot being positioned so that the axis about which the panel swings intersects the plane of the window panel approximately at the point where it enters the window well, and a regulator operatively connected to the lower edge of the panel for swinging the same.

2. In a window assembly for an automotive vehicle, a window frame defining a window opening having its forward edge inclined rearwardly from the bottom to the top of the frame, a window well below said opening, a swingable panel in said frame pivoted at its top and bottom edges between its front and rear edges, the front edge of the panel being inclined rearwardly from the bottom to the top, the upper pivot of the said panel being offset outwardly of the plane of the panel when in closed position and the lower pivot being positioned in the window well, and a regulator operatively connected to the lower edge of the panel for swinging the same.

3. In a window assembly, a swingable panel pivoted at its top edge between its front and rear edges, the upper pivot being offset outwardly from the plane of the window panel when in closed position, a downwardly projecting shaft at the lower edge of the panel between the front and rear edges of the panel, and a support for the swingable panel in the form of a regulator having a socket for receiving the lower end of the shaft.

4. In a window assembly, a swingable panel pivoted at its top and bottom edges between its front and rear edges, the upper pivot being offset outwardly from the plane of the window panel when in closed position, the pivot at the lower edge of the panel comprising a downwardly projecting shaft, a support for the swingable panel in the form of a regulator having a socket for receiving the lower end of the shaft, and yieldable means in the said socket for exerting an upwardly directed thrust against the end of the said shaft.

5. In a window assembly for a window opening with a window well therebelow, a swingable panel pivoted at its top edge between its front and rear edges, the upper pivot being offset outwardly from the plane of the window panel when in closed position, a downwardly projecting shaft at the lower edge of the panel, a window regulator mounted within the window well for supporting the panel, the said regulator having a rotatable gear with a socket for non-rotatably receiving the lower end of the said shaft, and yieldable means mounted within the said gear for exerting an upward thrust against the end of the said shaft.

6. In a window assembly, a swingable panel having a pivot at its top edge between its front and rear edges, the said pivot being offset outwardly from the plane of the window panel when in closed position, a downwardly projecting shaft at the lower edge and between the front and rear edges, the longitudinal axis of which is aligned with the upper pivot, and a receiver for the swingable panel shaft in the form of a regulator having an inclined socket for receiving the lower end of the shaft, the said socket being rotatable about the longitudinal axis of the said shaft whereby the panel may be regulated through the said regulator.

7. In a window assembly, a swingable panel pivoted at its top and bottom edges between its front and rear edges, the upper pivot being offset outwardly from the plane of the window panel when in closed position, the pivot at the lower edge of the panel comprising a downwardly projecting and inwardly inclined shaft having its longitudinal axis aligned with the upper offset pivot, a receiver for the swingable panel shaft in the form of a worm gear regulator having a worm gear rotatable about the inclined longitudinal axis of the said shaft, a socket in the said gear for receiving the lower end of the said shaft, and a spring loaded seat within the said gear for the lower end of the shaft and for exerting an upwardly directed thrust against the end of the said shaft.

8. The combination with a window panel swingable in a window opening about an up and down axis somewhat to the rear of its forward edge and having a downwardly projecting shaft at its lower edge, of a window regulator comprising a casing mounted below the window opening, a worm gear rotatably mounted within the said casing for rotation about an up and down axis, an axial socket in the said gear for receiving the end of the said shaft and transmitting the driving torque to the shaft for swinging the window, a seat in the said socket for the lower end of the shaft movable axially in the said socket, and resilient means supported by the bottom of the socket for exerting an upwardly directed thrust against the said seat to take up any looseness of the swingable panel in the window opening.

9. In combination with a window panel swingable in a window opening about an up and down axis somewhat to the rear of its forward edge and having a downwardly projecting shaft at its lower edge, of a window regulator comprising a casing mounted below the window opening, a worm gear rotatably mounted within the said casing for rotation about an up and down axis, an axial opening through the said gear for receiving the end of the said shaft and transmitting the driving torque to the shaft for swinging the window, a seat in the said opening for the lower end of the shaft in the form of a disk movable axially in the said opening, resilient means beneath the said seat for exerting an upwardly directed thrust against the said seat, and a disk for closing the lower end of the opening and serving as a support for the said resilient means, the lower end of the axial opening being peened over to hold the supporting disk in position.

10. In a window assembly for an automotive vehicle having a window opening and window well therebelow, a swingable panel pivoted at its top and bottom edges, the upper pivot being offset outwardly of the panel when in closed position, a regulator positioned in the opening in the window well for swinging the panel about its pivots, and means passing through the mouth of the window well for connecting the window panel to the regulator.

11. In a window assembly for a vehicle, the combination with a body having a window opening, of a window regulator arranged to be positioned in the body below the window opening and provided with an actuating member having an upwardly directed socket, and a window unit comprising a supporting frame and a panel pivoted on an upright axis in said frame and having a stem projecting downwardly arranged when the window regulator is already mounted below the window opening to project as a key into said socket and couple the panel and the actuating member in driving relation when the window unit is mounted in place in the window opening.

12. In a window assembly for a vehicle, the combination with a body having a window opening, of a window regulator arranged to be positioned in the body below the window opening and provided with a driven gear having a socket upwardly directed, and a window unit comprising a supporting frame and a panel pivoted on an upright axis in said frame and having a stem projecting downwardly arranged when the window regulator is already mounted below the window opening to project into said socket and rotatably couple the panel and the actuating member in driving relation when the window unit is mounted in place in the window opening.

13. In a window assembly for a vehicle, the combination with a body having a window opening, of a window regulator arranged to be positioned in the body below the window opening and provided with a worm gear having an upwardly open polygonal socket and a worm for driving the worm gear arranged to be turned by a hand crank, and a window unit comprising a supporting frame and a panel pivoted on an upright axis in said frame and having a stem complementary with said polygonal socket projecting downwardly arranged when the window regulator is already mounted below the window opening to make a key like connection with said socket and couple the panel and the actuating member in driving relation when the window unit is mounted in place in the window opening.

14. In a window assembly for a vehicle, the combination with a body having a window opening, of a window regulator arranged to be positioned in the body below the window opening and provided with a worm gear having an upwardly directed socket, a worm for driving the worm gear, a driving shaft for the worm, and a casing for housing and journalling said regulator element and through which the driving shaft projects, said casing arranged to be secured to the said body, and a window unit comprising a supporting frame and a panel pivoted on an upright axis in said frame and having a stem projecting downwardly arranged when the window regulator is already mounted below the window opening to project into said socket to make a removable key connection therewith and couple the panel and the actuating member in driving relation when the window unit is mounted in place in the window opening.

15. In a window assembly for a vehicle, the combination with a body having a window opening, of a window regulator arranged to be positioned in the body below the window opening and provided with an actuating member having an upwardly directed slip joint socket, and a window unit comprising a supporting frame and a panel pivoted on an upright axis in said frame, and having a stem projecting downwardly arranged when the window regulator is already mounted below the window opening to project into said socket and couple the panel and the actuating member in driving relation when the window unit is mounted in place in the window opening, and means for putting said panel when assembled under an up and down yielding thrust.

16. In a window assembly for a vehicle, the combination with a body having a window opening, of a window regulator arranged to be positioned in the body below the window opening and provided with an actuating member having an upwardly directed slip joint socket, and a panel pivoted on an upright axis and having a stem projecting downwardly arranged when the window regulator is already mounted below the window opening to make a slip joint with said socket and couple the panel and the actuating member in driving relation when the window panel is mounted in place in the window opening.

17. In a window assembly for a vehicle, the combination with a body having a window opening, of a window regulator arranged to be positioned in the body below the window opening and provided with a worm gear having an upwardly directed slip joint socket and a worm for driving the worm gear arranged to be turned by a hand crank, a panel pivoted on an upright axis and having a stem projecting downwardly arranged to make a slip joint with said socket and couple the panel and the actuating member in driving relation when the window panel is mounted in place in the window opening.

18. In a window assembly for a vehicle, the combination with a body having a window opening, of a window regulator arranged to be positioned in the body below the window opening and provided with an actuating member having an upwardly directed slip joint socket, and a panel pivoted on an upright axis and having a stem projecting downwardly arranged when the window regulator is already mounted below the window opening to project into said socket and couple the panel and the actuating member in driving relation when the window panel is mounted in place in the window opening, and means for putting said panel stem when assembled in the said socket under an up and down yielding thrust.

HERBERT C. FIELD.
BENJAMIN H. BOWLUS.

CERTIFICATE OF CORRECTION.

Patent No. 1,996,572. April 2, 1935.

HERBERT C. FIELD, ET AL.

It is hereby certified that error appears in the printed specification of the above numbered patent requiring correction as follows: Page 3, second column, line 20, claim 10, strike out the words "in the opening" and insert the same after the syllable "tion" and before the comma, in same line and claim; and that the said Letters Patent should be read with this correction therein that the same may conform to the record of the case in the Patent Office.

Signed and sealed this 28th day of May, A. D. 1935.

Leslie Frazer (Seal) Acting Commissioner of Patents.